UNITED STATES PATENT OFFICE.

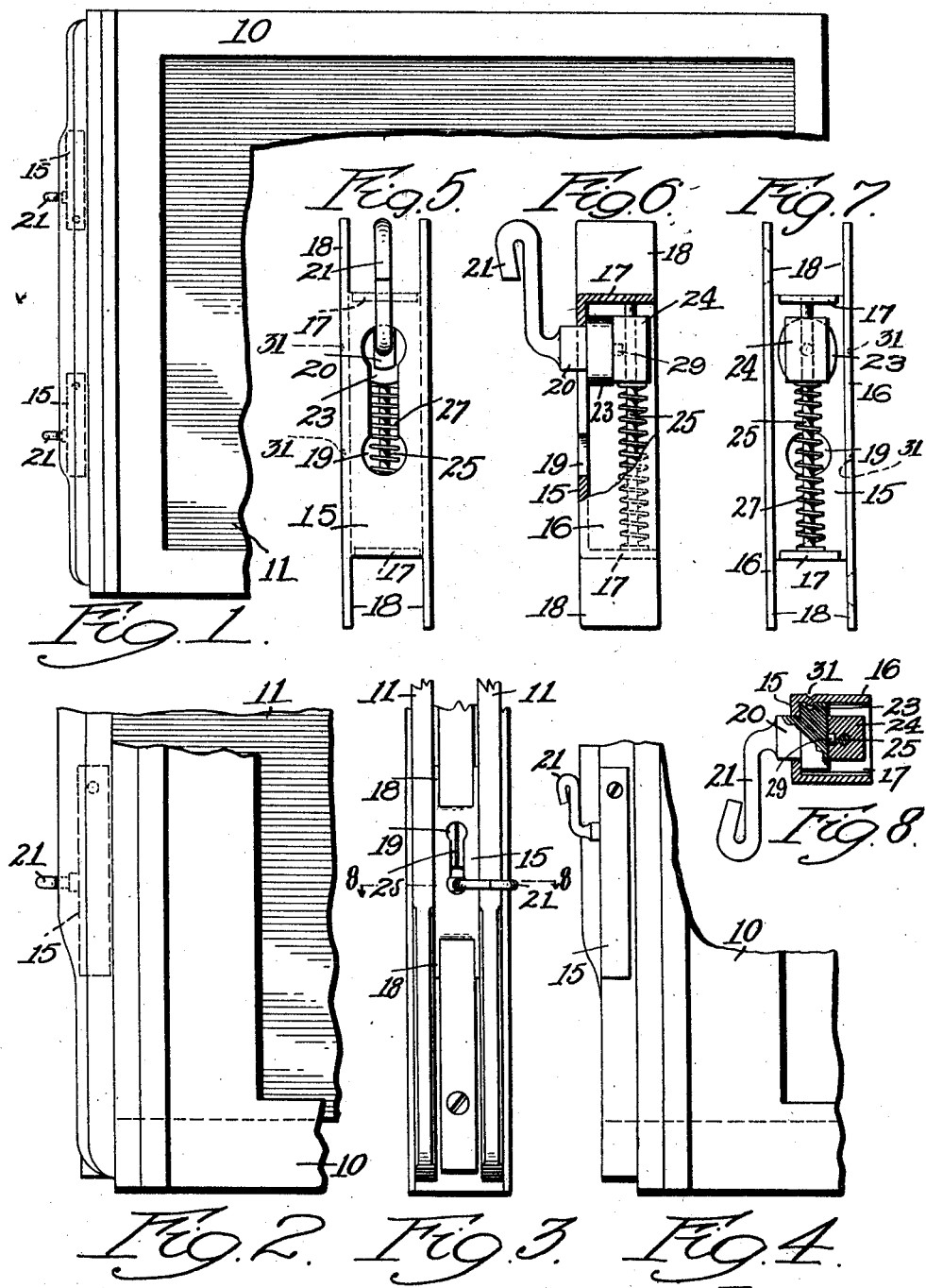

ALFRED JOSEPH VIGNEAULT, OF WORCESTER, MASSACHUSETTS, ASSIGNOR OF ONE-HALF TO GEORGE N. VIGNEAULT, OF WORCESTER, MASSACHUSETTS.

INDICATOR FOR PLATE-HOLDERS.

1,384,363. Specification of Letters Patent. Patented July 12, 1921.

Application filed April 8, 1920. Serial No. 372,339.

*To all whom it may concern:*

Be it known that I, ALFRED J. VIGNEAULT, a citizen of the United States, residing at Worcester, in the county of Worcester and State of Massachusetts, have invented a new and useful Indicator for Plate-Holders, of which the following is a specification.

This invention relates to a device for use in preventing double exposure of photographic plates. It is well known that the camera operators depend on the reversal of the slides that cover the plates to indicate whether the plates in a plate holder have been exposed. In other words, the plates are put in the holder in the dark room and the operator who does this is careful to place all the slides which cover fresh plates in the same position. It is usually in position with the light side of the edge of the slide on the outer surface. When the operator removes this slide to expose the plate, he turns it around and then replaces it. Thereafter he knows that the plate has been exposed, because when the slide is returned it is put back the black side out. However, it is very common for operators to forget to make this reversal or else to make it twice, and this results in the loss of a material percentage of the plates, time, and pictures, some of which cannot be taken again. Sometimes this is very serious because it ruins two pictures every time.

This invention is designed to provide means that will automatically indicate, not directly the exposure of the plate, but the withdrawal of the slide and its replacement and will lock the slide in position, and also to provide means for this purpose which will be very simple and inexpensive and will not involve any addition to the work of the dark room man or any change in the mode of manipulating a plate and slide on the part of the operator. The invention also involves features of construction as will appear.

Reference is to be had to the accompanying drawings in which—

Figure 1 is a side view of a plate holder and slide with a preferred embodiment of this invention applied to them.

Fig. 2 is a similar view showing one of the indicators enlarged;

Fig. 3 is an edge plan view of the same, both Figs. 2 and 3 showing the parts in the position they appear in when they leave the dark room;

Fig. 4 is a side view showing the parts in the position they assume when the slide has just been removed;

Fig. 5 is an enlarged edge plan view of the indicator removed from the plate holder in the same position as in Fig. 4;

Fig. 6 is a side view of the same with parts in section;

Fig. 7 is a bottom plan view, and

Fig. 8 is a sectional view on the line 8—8 of Fig. 3.

It is customary for the plate holder 10 to be provided at the end of its edge wall with two rotatable bent screws. When the dark room man loads a plate and puts the two slides 11 in position he turns these two screws in opposite directions, so that their horizontal ends project over the two slides respectively. The operator, in order to remove either slide, has to turn the corresponding one of these screws so that it will be out of the way. When he removes the slide, reverses it, and returns it, he is supposed to turn the screw back again. It will be seen therefore that after he has accomplished all this the screw itself does not serve in any way as an indicator, because it is in exactly the same position after exposure as before. It is nothing but a lock to prevent accidental displacement of the slide.

I take advantage of this custom and construction to provide a true indicator, which preferably shall be of the same shape and appearance as the old bent screw and will not give either the dark room man or the camera operator any additional work or cause him to devote any different kind of attention to the work than has been the case heretofore and yet will accurately indicate when the slides have been withdrawn or replaced.

For this purpose I provide on the plate holder a support shown in the drawings in the form of a sheet metal frame 15. This is bent up into a channel shape providing side walls 16 which extend at both ends and on both sides beyond the main body of the support to form ears 18 through which it is screwed to the plate holder. It is provided with a slot 19 of a double keyhole shape, that is with enlargements at both ends.

Extending through this slot is a flat sided member 20 which, in the form shown, has a projecting arm 21 of similar shape to that of the ordinary bent screw but I have shown it bent back at the end to form a better handle. It performs all its usual functions. This member 20, is flat sided so that when turned to the position shown in Fig. 5 it is free to move along the slot 19 but when in either of the circular enlargements of the slot and turned as shown in Fig. 3 it extends clear across the enlargement and is locked against sliding. It cannot be turned to locking position unless it is at one of the ends of the slot. It has an integral disk 23 on the bottom made narrow one way so as to slide easily in the casing when turned to one position. It is swiveled at 29 on a slide 24 and moves along the underside of the front of the frame 15 and constitutes means for holding the device in proper position thereon. This construction is very easy to assemble. The slide 24 moves along a rod 25 fixed to the ends 17 of the frame 15 and constituting a guide for this slide. A spring 27 normally forces the slide to the position shown in Figs. 4 to 7, inclusive.

I have also shown the outer surface of the frame 15 as having two depressions 31 each forming a projection inside the frame to engage in a depression on the longest end of the surface of the disk 23 when the arm 21 is in locking position at either end of the slot, and the disk engages the projection in the casing. The disk 23 is shaped so that the end that has the depression bears with a little pressure on one wall 16 when the handle is turned crosswise. This yieldingly holds the arm in either extreme position and resists its being turned away from that position. If it is turned half way around so as to extend over the wrong slide there is no such resistance.

In the use of the device the dark room operator loads the plate holder and introduces the slide in the same way as under present conditions. Then he moves the arm 21 back against the action of the spring until the member 20 is at the outer extreme end of the slot 19. Then he turns the arm 21 over to position to lock the slide the same as he does now with the stationary bent screw. The arm is yieldingly locked in that position as stated. This is shown at the bottom of Fig. 1, and also in Figs. 2 and 3. This of course is done at both sides of the plate holder and it is then taken to the camera operator who receives it in that condition.

In order to expose the plate he has to withdraw the slide and in order to withdraw the slide he has to turn the arm 21 back into the position shown in Figs. 4 to 7 inclusive, but it will be remembered that when he first does that the member 20, and therefore the axis of the arm 21, will be at the outer end of the slot, that is the position indicated in Fig. 3. But when the arm 21 is turned back into longitudinal position there is nothing to prevent its sliding along the slot and the spring 27 will force it to do so. Therefore it immediately comes to the inner end of the slot, that is the exact position shown in Figs. 4 to 7. Thus it shows by its position in the slot that the slide has been removed and replaced. The arm 21 is then turned out over the slide to lock it in, but even if this is not done it serves its purpose as an indicator.

Although I have illustrated and described only a single form of the invention, I am aware of the fact that many modifications can be made therein by any person skilled in the art within the scope of the invention as expressed in the claims. Therefore I do not wish to be limited to all the details herein shown and described, but what I do claim is:—

1. The combination with a plate holder and its plate covering slide, of means on the plate holder for locking the slide therein, said means being movable to two positions along the edge of the plate holder and showing by its position along said edge whether the plate covered by said slide has been exposed, said means having an arm pivoted thereon and adapted, in each position, to be turned to lock the slide.

2. The combination with a plate holder adapted to carry a slide for covering a sensitized plate, of an indicator having an arm adapted to be turned to a position to project over the edge of a slide to lock it in position, and means whereby when said indicator arm is turned from locking position the indicator will be moved automatically and bodily to another position to indicate by its new position that the slide has been unlocked.

3. The combination with a plate holder adapted to carry a slide for covering a sensitized plate, of an indicator having an arm adapted to be turned to a position to project over the edge of a slide, a support on the plate holder for said indicator, having a guide slot with enlarged ends, said indicator having a non-circular part slidable along the slot when the indicator arm is turned away from locking position.

4. The combination with a plate holder and slide, said plate holder having a slot in the edge thereof, with an enlargement at each end, of a slide having a thickness to enable it to move in the slot and having a length greater than the width of the slot but not greater than the diameter of said enlargements, whereby when it is turned transversely in either enlargement it cannot move along the slot, and a spring for moving it along the slot when turned to the right position.

5. The combination with a plate holder and slide, said plate holder having a slot, with an enlargement at the end, of a slide having a thickness to enable it to move in the slot and having a length greater than the width of the slot but not greater than the diameter of said enlargement, and a spring for moving it along the slot when turned to the right position, and means for yieldingly locking the slide in its transverse position at the end of the slot with its arm projecting into locking position over the right slide.

6. The combination with a plate holder and slide, of movable means longitudinally mounted to turn on a pivot for locking the slide in position and also for showing by its position along the edge of the holder whether the slide has been removed and replaced.

7. The combination with a plate holder and slide, of bodily movable means for locking the slide in position and also for showing by its position along the edge of the holder whether the slide has been removed and replaced, said means comprising a slide, a disk having a central projection rotatably mounted in the slide, and a wall against the surface of which the disk engages.

8. The combination with a plate holder adapted to carry a slide for covering a sensitized plate, of an indicator having an arm bent double at its end and adapted to be turned to a position to project over the edge of a slide to lock it in position, and means whereby when said indicator arm is turned from locking position the indicator will be moved to another position to indicate by its new position that the slide has been unlocked.

In testimony whereof I have hereunto affixed my signature.

ALFRED JOSEPH VIGNEAULT.